O. LUGO & T. O. L. SCHRADER.
PROCESS OF DISTILLING PETROLEUM OILS AND OTHER SUBSTANCES.
No. 60,396.  Patented Dec. 11, 1866.
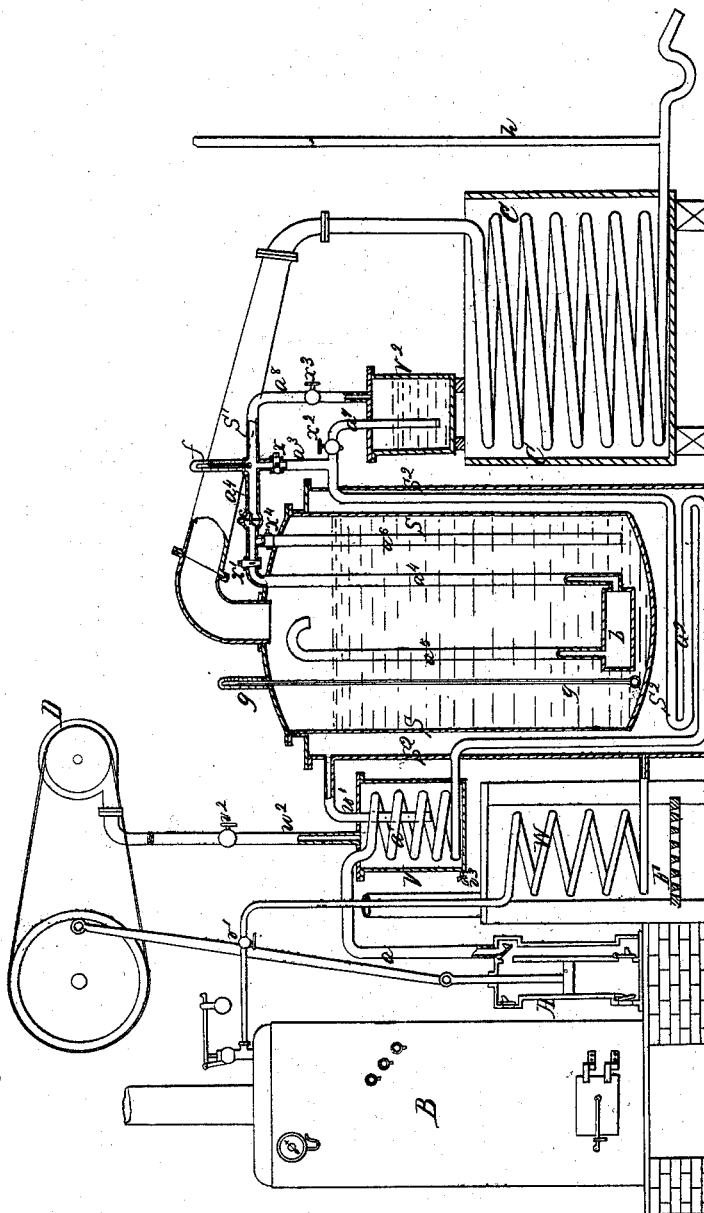

United States Patent Office.

IMPROVED PROCESS OF DISTILLING PETROLEUM OILS AND OTHER SUBSTANCES.

ORAZIO LUGO AND T. O. L. SCHRADER, OF NEW YORK, N. Y.

Letters Patent No. 60,396, dated December 11, 1866.

*The Schedule referred to in these Letters Patent and making part of the same.*

TO ALL WHOM IT MAY CONCERN:

Be it known that we, ORAZIO LUGO and THEODORE O. L. SCHRADER, both of the city, county, and State of New York, have invented certain new and useful improvements in the process of Distilling Petroleum and other oils or substances; and we do hereby declare that the following is a full, clear, and exact description of the same, reference being had to the accompanying drawing, which forms part of this specification, and represents a vertical section of an apparatus by which our invention may be performed.

Our invention relates to the introduction of atmospheric air or gas, during the distilling process, among the vapors eliminated from petroleum or other oils or substances by the heat applied to the still. It consists in heating the air or gas, previous to its admission among the vapors, to a temperature equal, or thereabouts, to that of the oil in the still, by the same means or medium employed to heat the still, and in such manner that the temperature of the air or gas admitted increases or decreases with the temperature of the oil in the still, whereby the process of distillation is accelerated and kept under perfect control, and we are enabled to obtain from petroleum a nitrogenized hydro-carbon oil of a non-explosive character and of superior illuminating power. It also consists in the employment of the waste heat from the still for the preparatory heating of the air or gas to be admitted to the still, prior to its being subjected to the final heating, by the same means or medium by which the still itself is heated. In thus admitting heated air among the vapors eliminated from oils or hydrocarbons in the distilling process, there is some danger, without great care is exercised, after it has become necessary, in the progress of distillation, to increase the heat to a high degree, say over 300° F., that ammoniacal gases would be evolved, and that, consequently, there would be great loss of distillate. To obviate this, another feature of our invention consists in causing the heated air, at such stage of the distillation as may be desirable, to pass through or in contact with a suitable hydro-carbon of heavy specific gravity, or with any other suitable oil, before its introduction among the heated vapors of the still. The mode or means of heating the still, and the air to be admitted among the vapors eliminated by distillation, as well as the construction and arrangement of the apparatus employed in our improved process may be considerably varied; but the apparatus and means of heating represented in the drawing are what we have successfully used experimentally in the distillation of petroleum, and we believe, as far as our present experience serves, that none can be better adapted to obtain the most successful result.

S is the still, which may be of ordinary or any suitable construction, and is heated by steam in a surrounding jacket, $S^2$, such steam being superheated on its way from the boiler to the said jacket, by passing through a coil of pipe, W, in a furnace, F. The outlet pipe of the still leads to a condenser, C, of ordinary or suitable construction. A is an air compression pump, the inlet to which is in constant communication with the atmosphere, and the outlet communicates, by a train of pipes, $a$, $a^1$, $a^2$, $a^3$, $a^4$, $a^5$, $a^6$, $a^7$, $a^8$, with the interior of the still. The portion $a^2$ of this steam pipe is coiled, or otherwise so arranged, within the steam jacket of the still, in a circuitously lengthened form, that the air, in passing through the said portion of the pipe which is surrounded by the superheated steam by which the still is heated, will be subject to the same heat as the still, and so heated nearly to the same temperature as the oil in the still. From the jacket, a portion, $a^3$, of this train of pipes conducts the heated air onward to a branch pipe, $a^4$, which enters the still at the top and descends through the oil in the still to a box, $b$, near the bottom thereof, and from this box another branch, $a^5$, of the pipe ascends to and opens into the upper part of the still. The air passing through the coil $a^2$, pipe $a^4$, box $b$, and pipe $a^5$, is delivered into the upper part of the still, among the vapors eliminated by distillation, at about the same temperature as that of the vapors themselves. The branch pipe, $a^6$, provides for the introduction of the heated air among the liquid in the lower part of the still, and the branch pipe, $a^7$, provides for the admission of the heated air, before its entrance into the still, into a vessel, $V^2$, which contains a suitable quantity of heavy hydro-carbon or other suitable oil or liquid, and from which the pipe $a^8$ communicates with the pipe $a^4$, leading into the still. The pipe $a^4$ is fitted with a check-valve, $c$. The portion $a^1$ of the air pipe is coiled or otherwise arranged in a circuitously lengthened form within a vessel, V, through which the waste steam escapes by the pipes, $w^1$ and $w^2$, after having heated the still, and thereby causes the air to be warmed by the waste heat from the still, preparatory to its being further heated by the same medium by which the still is heated, viz: the steam in the jacket $S^2$. The pipe $w^2$, by which the steam escapes from the vessel V, may conduct the escaping steam to a steam engine, to be driven by it for giving motion to the air pump, A. The drawing represents a rotary engine, D, by which the escaping steam is utilized. The steam pipes are furnished with stop-cocks or valves, $v^1$ and $v^2$, to regulate the admission and escape of steam to and from the jacket $S^2$, of the still. The vessel V is also furnished with an escape cock, $v^3$, to provide for the escape of steam or any water of condensation from it. The air pipes are furnished with stop-cocks or valves, $x$, $x^1$, $x^2$, $x^3$, and $x^4$, and the branch air pipe, $a^4$, is furnished with a thermometer, $f$, to indicate the temperature of the air about to be admitted to the still. The still is also furnished with a thermometer, $g$, to indicate the temperature of the liquid in the still.

The operation of distilling petroleum is conducted in the following manner: The still having been charged and steam at a pressure of twenty-five (25) to thirty (30) pounds per square inch having been generated in the boiler, the stop valve $v^1$ is opened to admit it to the jacket $S^2$, and as soon as the thermometer $g$, in the still, shows a temperature of about 100° Fahrenheit, the stop valve $v^2$, is opened to start the engine and drive the air pump slowly, the air stop-valves, $x^2$ and $x^3$, being closed, and $x^1$ and $x^4$ opened. Distillation having now commenced, the heat of the still and of the air, as indicated by the thermometers $f$ and $g$, must be increased by making a fire in the furnace, F, to superheat the steam, and the temperature indicated by the two thermometers kept uniform by opening or closing the cock $v^3$, the opening of the said cock reducing the supply of steam to the engine and reducing the supply of air, and the closing of the said cock producing an opposite effect. It does not, however, make any material difference if the air is from 25° to 30° Fahrenheit, hotter than the contents of the still, but is preferable, if not absolutely necessary, that the air should not be cooler. When distillation is fairly in progress, the stop-valve $x^4$ may be closed to stop the admission of air through the pipe $a^6$, below the liquid, as the object of this admission of the air is mainly to agitate the liquid and cause all parts of it to be equally heated. As the distillation progresses, the heat of both the still and the air admitted to it will gradually increase, and as soon as the temperature rises to about 300° F., and the specific gravity of the distillate, which comes over through the condenser, to about 50° Baumé, there is some danger that, without great care on the part of the distiller, in regulating the constantly increasing heat of the still and the admitted air, there will be too strong a chemical action of the air upon the vapor, and ammoniacal gases will make their appearance at the gas escape pipe $h$, near the outlet of the distilling apparatus; and, therefore, at this stage it is preferable to close the air stop-valve $x$, and open $x^2$ and $x^3$, thereby causing the air to pass by the pipes $a^7$ and $a^8$, through or in contact with the heavy oil or hydro-carbon in the vessel $V^2$, and be so charged with the vapor from the said oil before its admission into the still as to prevent its too intense chemical action on the vapors. It is of importance, too, after this stage, that the heat be allowed to increase very gradually; and it may, indeed, be sometimes necessary to temporarily check the increase of temperature, or even to reduce it, when it is indicated at $k$ that the formation and escape of ammoniacal gas is taking place. The distillation, with proper care that the heat is not increased too rapidly, will proceed until all the contents of the still but a very small residuum have been distilled. It is desirable throughout the process that the admission of air to the still should be properly controlled, for if the air be admitted too rapidly or in too great volume, the vapors will come over from the still without being condensed, and if too little air be admitted, there is danger of the formation of ammoniacal gases. No rule can be laid down for the regulation of the proper quantity of air, as this may depend upon the quality of the oil or substance to be distilled, and will soon make itself known to the distiller, who will regulate the speed of the pump accordingly. Gas has been mentioned as a substitute for air in the process. The gas we have particularly contemplated using is carbonic acid, but it is more expensive to obtain than air, and we do not, as far as our present experience serves, believe that it would be as effective, and have only mentioned the use of gas instead of air as a merely possible substitute, which we consider embraced by our invention.

As the process of admitting heated air into the still, as hereinbefore described, may be used advantageously in the distillation of alcoholic liquors, to accelerate the distilling process, we desire our invention to be understood as embracing the use of air in this way in the distillation of such liquors.

What we claim as our invention, and desire to secure by Letters Patent, is—

1. The admission of air or gas into the still at a temperature equal to or greater than that of the oil or substance undergoing the distilling process, substantially as herein described.

2. The heating of the air or gas previous to its admission into the still, by the same means or medium employed for the heating of the still itself, and in such manner that the temperatures of the substance undergoing distillation, and that of the air or gas admitted to the still, will increase or decrease in, or nearly in, the same ratio, substantially as herein described.

3. The utilization of the waste heat from the still by its employment to effect a preparatory heating of the air or gas which is to be admitted into the still, substantially as herein set forth.

4. Causing the air or gas, while in the heated state, but before its admission into the still, to pass through or in contact with an oil of suitable character, substantially as herein specified.

ORAZIO LUGO,
THEO. O. L. SCHRADER.

Witnesses:
A. LE CLERC,
HENRY T. BROWN.